United States Patent [19]

[11] 3,904,873

[45] Sept. 9, 1975

Demaine et al.

[54] OPTICAL ARRANGEMENT

[75] Inventors: David George Anthony Demaine, Leeds; John Allan Hall-Jackson, Acomb, both of England

[73] Assignee: The Rank Organisation Limited, London, England

[22] Filed: Jan. 29, 1974

[21] Appl. No.: 437,691

[30] Foreign Application Priority Data

Jan. 30, 1973 United Kingdom................ 4505/73

[52] U.S. Cl. ................. 250/227; 250/568; 250/570

[51] Int. Cl.²........................ G02B 5/14; G06K 7/10

[58] Field of Search ........... 250/227, 566, 567, 568, 250/569, 570

[56] References Cited

UNITED STATES PATENTS

| | | | |
|---|---|---|---|
| 3,349,906 | 10/1967 | Calhoun et al. | 250/227 X |
| 3,459,240 | 8/1969 | Erickson | 250/227 |
| 3,533,657 | 10/1970 | Da Silva | 250/568 X |
| 3,622,793 | 11/1971 | Dalton | 250/570 |
| 3,826,900 | 7/1974 | Moellering | 250/568 X |

*Primary Examiner*—James W. Lawrence
*Assistant Examiner*—T. N. Grigsby
*Attorney, Agent, or Firm*—Brisebois & Kruger

[57] ABSTRACT

A document reading head of the single reading point type comprising a support, a lamp, a photodetector and an optical system comprising a reading lens, all carried by the support, and fibre optic means carried by the support for transmitting light to be used for reading from the lamp to the optical system and for transmitting light reflected from the document from the optical system to the photodetector.

22 Claims, 3 Drawing Figures

OPTICAL ARRANGEMENT

BACKGROUND TO THE INVENTION

This invention relates to a document reading head of the single reading point type, i.e. the type wherein light is focussed on a single point of the document and the point of light and the document are relatively moved in two coordinate directions to effect scanning.

Usually, the reading head is moved to scan back and forth across the document, while the document is mounted on a drum movable in steps in the other coordinate direction. The direction of continuous scan, usually by movement of the reading head along a line across the document, is referred to hereinafter as the primary direction of scan.

PRIOR ART

In a known document reading head of the single reading point type, a support carries a lamp, beam splitter, lens unit and photodetector. The beam splitter is mounted to transmit light in one direction from the lamp to the lens unit and to reflect light in the opposite direction from the lens unit to the photodetector, or vice versa.

Various disadvantages arise with the known device. Firstly, precise positioning of the lamp, lens unit and photodetector are required in order to achieve accurate focussing and alignment. This necessitates, for example, that the complete head be returned to the workshop for replacement of a faulty lamp or photodetector. Secondly, light losses in the beam splitter demand the use of a specialised and expensive lamp and a relatively complicated reading lens in the lens unit. This, together with the need to maintain close tolerances of manufacture and/or assembly, makes the known device relatively costly.

OBJECT OF THE INVENTION

An object of the present invention is to provide a document reading head of the single reading point type in which the disadvantages of the known device are obviated or minimised, while at the same time the device remains capable in practice of detecting changes in light scattered from a point on a document, with a specified resolution, and with sufficient tolerance to provide a usuable signal from faded, indistinct and relatively uneven document texture, including absorption of the effects of creases in the document.

BRIEF SUMMARY OF THE INVENTION

The document reading head of the single reading point type according to the present invention comprises a support, a lamp, a photodetector and an optical system comprising a reading lens, all carried by the support, a fibre optic means carried by the support for transmitting light to be used for reading from the lamp to the optical system and for transmitting light reflected from the document from the optical system to the photodetector.

FURTHER FEATURES OF THE INVENTION

Preferably, the fibre optic means comprises a block carried by the support and in which fibre optic bundles are encapsulated. In one embodiment, the block incorporates two fibre optic bundles at least partly interleaved at their ends adjacent the optical system for light transmission to and from the reading lens. In another embodiment, the fibre optic means comprises two fibre optic bundles connected to a fibre optic integrating rod, from which light is directed to and received from the reading lens through an aperture plate. The first embodiment has the advantage that the integrating rod and aperture plate are dispensed with. However, in either case, the fibre optic bundles form a Y-junction for light transmission to and from the optical system.

Conveniently, the lamp and photodetector may be detachably fitted to the support. Due to the double spatial filtering of the light which occurs in the fibre optic means, the required resolution is maintained over a greater depth of focus. The larger tolerances thus permitted enable the lamp and photodetector to be replaced in situ by a service engineer. Preferably, therefore, the lamp is of the self-focussing type. A lamp having a lens at the light transmitting end of its envelope is especially suitable, but alternatively a large filament lamp inherently designed to emit a cone of light may be employed. In either case, it is not necessary to use a specialised and expensive lamp of high power. This is due to the fact that the light losses in the fibre optic means are less than in the beam splitter of the known device. The reduced light losses may also permit the use of a simpler reading lens, for example a lens having two components instead of the three component lens of the known device.

A smaller number of parts are required in the present document reading head compared with the known device. This fact, together with the larger permissible tolerances, enable such parts as the support to be made by casting or like processes, ready for use without further machining.

Further refinements are possible to give the head an improved capability for clearly reading creased documents. Creases in a document affect the accuracy of focus. Typically, light transmission may be reduced by 25 percent due to defocussing of 0.01 of an inch.

Thus, in the embodiment employing interleaved fibre bundles, the stem of the Y-junction of the fibre bundles, in the direction perpendicular to the intended primary direction of scan of the reading head, has a central region formed by interleaved fibers and side regions one of which is formed by fibres belonging to one of the fibre bundles and the other by fibres belonging to the other fibre bundle. The additional fibres at the side regions of the Y-junction assist in maintaining illumination levels in out-of-focus conditions, but lead to some single spatial filtering in the primary direction of scan. This is acceptable in practice owing to the conventional high electronic frequency response in this direction.

In addition, the reading lens may be associated with a diaphragm defining a rectangular aperture which has its major dimension perpendicular to the intended primary direction of scan of the reading head. The effect of such an aperture is to increase the spatial frequency response of the head, as well as to increase the stability of light transmission with defocussing. An aperture cross-section of about 50 percent of the lens area has been found especially useful; although a 40 percent loss of energy occurs, this is not an important disadvantage in practice because loss of light is in other respects minimised by use of the fibre optic bundles.

The rectangular aperture may be useful in embodiments other than the one described above in which the stem of the Y-junction has a central region of interleaved fibres. However, the use of the two refinements in combination makes possible a still further modification. In this further refinement, the central region of the section of the stem of the Y-junction is rectangular, with its major dimension parallel to the intended primary direction of scan. This is possible because the double spatial filtering in the primary direction of scan, together with the reduced lens aperture in this direction, lead to a substantial excess of optical frequency response in the primary direction of scan. Doubling the dimension of the section of the Y-junction, in the primary direction of scan, not only compensates for the loss of transmission due to the reduced aperture, but also gives a further improvement in the stability of light transmission with defocussing.

BRIEF DESCRIPTION OF DRAWINGS

A preferred practical embodiment of single reading point document head in accordance with the invention will now be described by way of example with reference to the accompanying drawings, in which.

DESCRIPTION OF EMBODIMENTS

Figure 2:
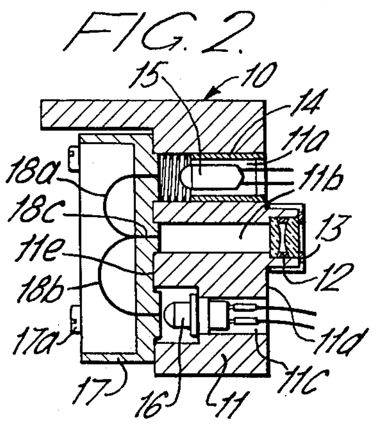
FIG. 2 shows a practical construction in crosssection.

In this embodiment, shown in FIG. 2, the document head comprises a support 10 in the form of a sintered aluminium alloy moulding 11. The moulding 11 has three apertures or through-holes 11*a*, 11*b* and 11*c* with their axes coplanar. The central aperture 11*b* is internally shouldered to provide a seat for a two component moulded reading lens 12, which is retained in position by an apertured cap 13 fitted to the moulding 11. One lateral aperture 11*a* detachably receives a sleeve 14 in which a self-focussing lamp 15 is mounted in a predetermined position. The other lateral aperture 11*c* detachably receives the body of a photodetector 16.

The moulding 11 is adapted to receive the lamp holder and photodetector through aperture openings in one face 11*d* of said moulding. On its opposite face 11*e*, the moulding 11 receives a glass filled phenolic block 17 in which two fibre optic bundles 18*a*, 18*b* are effectively encapsulated. When the block 17 is fitted to the moulding 11 by means of locating bosses and fixing screws 17*a*, the two fibre optic bundles 18*a* and 18*b*, each of which is generally of U-shape, serve for the transmission of light from the lamp aperture 11*a* to the reading lens aperture 11*b* and from the reading lens aperture 11*b* to the photodetector aperture 11*c*. Thus, at the interface of the moulding 11 and the block 17, the respective fibre bundles 18*a*, 18*b* terminate at one end at the centres of the respective openings of the moulding apertures 11*a*, 11*c* containing the lamp 15 and the photodetector 16.

In the preferred embodiment, the other ends of the two fibre bundles are interleaved at the stem of a Y-junction 18*c* and the interleaved stem terminates at the centre of the opening of the moulding aperture 11*b* containing the reading lens 12.

Figure 1:
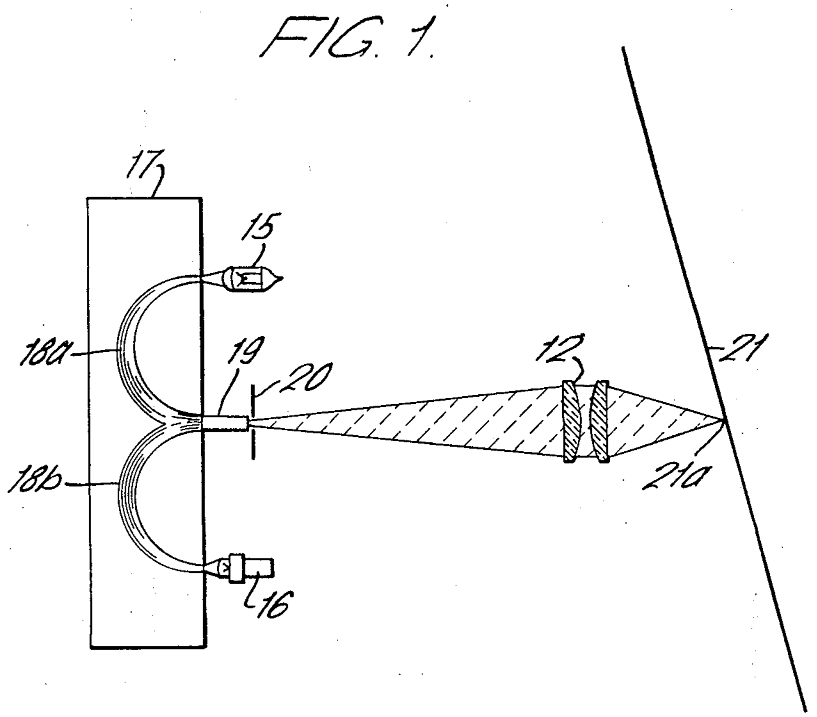
FIG. 1 shows the invention diagrammatically.

In a modification, illustrated diagrammatically in FIG. 1, the other ends of the two fibre bundles 18*a*, 18*b* terminate, side by side in the stem of a Y-junction 18*c*, at a fibre optic integrating rod 19. This projects a short distance into the central aperture of the moulding (not shown in FIG. 1) towards the reading lens 12, to terminate in an aperture plate or diaphragm 20 within said aperture.

Referring to FIG. 1, in use, light from the lamp is transmitted through one fibre optic bundle 18*a* to the axis of the reading lens 12 and focussed by said lens on to a single point 21*a* of the document 21 to be read, which is usually mounted on a scanning drum (not shown). The single point focus is traversed across the document, in the primary direction of scan, by movement of the head 10, the drum being moved in steps in the other coordinate direction. Light scattered from the document is returned through the reading lens 12 to the other fibre optic bundle 18*b* and thus transmitted to the photodetector 16.

A number of modifications are possible, in particular in the preferred embodiment employing interleaved fibres in the stem of the Y-junction 18*c*, to improve uniformity of response to creases and other changes in level of a document to be read.

Figure 3:
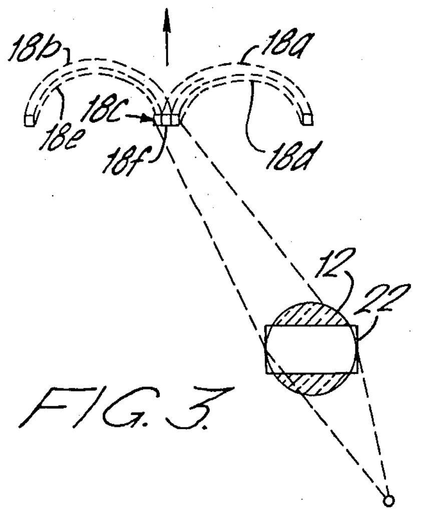
FIG. 3 shows modifications for improving performance.

In one modification, illustrated diagrammatically in FIG. 3, the reading lens 12 is associated with a rectangular aperture 22 covering about 50 percent of the total area of the reading lens, this aperture having its major dimension perpendicular to the primary direction of scan (arrowed).

In another modification, additional fibres 18*d*, 18*e* are incorporated in the two bundles 18*a*, 18*b*, and terminate at the respective opposite sides of the stem of the Y-junction 18*c* in the direction perpendicular to the primary direction of scan.

These two modifications, when used in combination, make possible a further refinement, in which at least the central region 18*f* of the stem 18*c* of the Y-junction has its dimension increased, for example doubled, parallel to the primary direction of scan.

The combined effect of these improvements is to give improved performance, especially with regard to the reading of creased documents, without overall loss in light transmission.

Various further modifications are possible within the scope of the invention.

We claim:

1. In a document reading head of the single reading point type comprising a support having first, second and third apertures therein, and an optical system, a lamp, and a photodetector respectively accommodated in said apertures, the improvement comprising:

two fibre optic bundles, one transmitting light from the lamp to the optical system and one transmitting light from the optical system to the photodetector, a block in which the two fibre optic bundles are encapsulated, said bundles having a Y-junction within said block whereby the said two bundles have a common termination at one point on the surface of the block and respective individual terminations at second and third points on the surface of the block, and means mounting the block on the support in a position in which said first, second and third apertures are in optical alignment with said first, second and third terminations respectively.

2. A document reading head according to claim 1 wherein the lamp and the photodetector are detachably fitted to the support.

3. A document reading head according to claim 1, wherein the lamp is self-focussing.

4. A document reading head according to claim 1, including a fibre optic integrating rod to which the Y-junction of the fibre optic bundles is connected, and an aperture plate through which light is directed to and received from the reading lens.

5. A document reading head according to claim 1, wherein the two fibre optic bundles are interleaved to form at least part of the cross-section of the stem of the Y-junction.

6. A document reading head according to claim 1, wherein the stem of the Y-junction of the fibre bundles, in the direction perpendicular to the intended primary direction of scan of the reading head, has a central region formed by interleaved fibres and side regions one of which is formed by fibres belonging to one of the fibre bundles and the other by fibres belonging to the other fibre bundle.

7. A document reading head according to claim 1, wherein the reading lens is associated with a diaphragm defining a rectangular aperture which has its major dimension perpendicular to the intended primary direction of scan of the reading head.

8. In a document reading head of the single reading point type comprising a support having first, second and third apertures therein, and an optical system comprising a reading lens, a lamp, and a photodetector respectively accommodated in said apertures, the improvement comprising:

two fibre optic bundles, one transmitting light from the lamp to the optical system and one transmitting light from the optical system to the photodetector, means mounting said two fibre optic bundles on the support so that the bundles form a Y-junction for light transmission to and from the optical system, and wherein the reading lens is associated with a diaphragm defining a rectangular aperture which has its major dimension perpendicular to the intended primary direction of scan of the reading head.

9. A document reading head as claimed in claim 8 in which the fibre optic supporting means comprises a block carried by the support and in which the fibre optic bundles are encapsulated.

10. A document reading head as claimed in claim 8 in which the lamp and photodetector are detachably fitted to the support.

11. A document reading head as claimed in claim 8 in which the lamp is self-focussing.

12. A document reading head as claimed in claim 8 in which the stem of the Y-junction of the fibre bundles, in the direction perpendicular to the intended primary direction of scan of the reading head, has a central region formed by interleaved fibres and side regions, one of which is formed by fibres belonging to one of the fibre bundles and the other by fibres belonging to the other fibre bundle.

13. A document reading head as claimed in claim 12 in which the central section of the stem of the Y-junction is rectangular, with its major dimension parallel to the intended primary direction of scan.

14. In a document reading head of the single reading point type comprising a support having first, second and third apertures therein, and an optical system comprising a reading lens, a lamp, and a photodetector respectively accommodated in said apertures, the improvement comprising:

two fibre optic bundles, one transmitting light from the lamp to the optical system and one transmitting light from the optical system to the photodetector, means mounting said two fibre optic bundles on the support so that the bundles form a Y-junction for light transmission to and from the optical system, and wherein the stem of the Y-junction of the fibre bundles, in the direction perpendicular to the intended primary direction of scan of the reading head, has a central region formed by interleaved fibres and side regions one of which is formed by fibres belonging to one bundle and the other by fibres belonging to the other fibre bundle.

15. A document reading head as claimed in claim 14 in which the fibre optic supporting means comprises a block carried by the support and in which the fibre optic bundles are encapsulated.

16. A document reading head as claimed in claim 14 in which the lamp is self-focussing and both the lamp and the photodetector are detachably fitted to said support.

17. A document reading head as claimed in claim 14 in which the reading lens is associated with a diaphragm defining a rectangular aperture which has its major axis perpendicular to the intended primary direction of scan of the reading head.

18. A document reading head according to claim 17, wherein the central region of the section of the stem of the Y-junction is rectangular, with its major dimension parallel to the intended primary direction of scan.

19. In a document reading head of the single reading point type comprising a support having first, second and third apertures therein, and an optical system comprising a reading lens, a lamp, and a photodetector respectively accommodated in said apertures, the improvement comprising:

two fibre optic bundles, one transmitting light from the lamp to the optical system and one transmitting light from the optical system to the photodetector, means mounting said two fibre optic bundles on the support so that the bundles form a Y-junction for light transmission to and from the optical system, a fibre optic integrating rod to which the Y-junction of the fibre optic bundle is connected, and an aperture plate through which light is directed to and received from the reading lens.

20. A document reading head according to claim 19, wherein the fibre optic supporting means comprises a block carried by the support and in which the fibre optic bundles are encapsulated.

21. A document reading head as claimed in claim 19 in which the lamp is self-focussing and both the lamp and the photodetector are detachably fitted to said support.

22. A document reading head as claimed in claim 19 in which the reading lens is associated with a diaphragm defining a rectangular aperture which has its major axis perpendicular to the intended primary direction of scan of the reading head.

* * * * *